United States Patent [19]

Buisson et al.

[11] 3,719,615

[45] March 6, 1973

[54] POLYHYDROXY CONDENSATES OF ISOCYANURIC ACID

[76] Inventors: Michel Buisson, "Les Esperelles," Chemi Henri Belin; Daniel Durand, "Villa Biancho" Avenue de l'Oliveraie, both of 13 Martigues, France

[22] Filed: March 15, 1971

[21] Appl. No.: 124,594

[30] Foreign Application Priority Data

March 23, 1970 France...............................7010332

[52] U.S. Cl...260/2.5 AW, 260/2.5 AQ, 260/2.5 AS, 260/77.5 NC, 260/248 NS
[51] Int. Cl.........................C08g 22/44, C08g 22/06
[58] Field of Search......260/2.5 AQ, 2.5 AR, 2.5 AS, 260/2.5 AW, 248 NS, 77.5 NC

[56] References Cited

UNITED STATES PATENTS

| | | | |
|---|---|---|---|
| 3,042,672 | 7/1962 | Lloyd | 260/248 |
| 3,115,479 | 12/1963 | Windemuth | 260/47 |
| 3,235,553 | 2/1966 | Sadle | 260/248 |
| 3,399,151 | 8/1968 | Kaiser | 260/2.5 |
| 3,462,381 | 8/1969 | Eaton et al. | 260/2.5 |
| 3,505,255 | 4/1970 | Granger et al. | 73/117.2 |

FOREIGN PATENTS OR APPLICATIONS 590,514 1/1960 Canada...........................260/248 NS

*Primary Examiner*—Donald E. Czaja
*Assistant Examiner*—H. S. Cockeram
*Attorney*—McDougall, Hersh & Scott

[57] ABSTRACT

This invention is addressed to novel polyhydroxyl compounds prepared by reaction of isocyanuric acid, formaldehyde, and an alkanol amine and their polyalkylene oxides derivatives, and to polyurethanes prepared from these polyhydroxyl compounds and organic isocyanates.

14 Claims, No Drawings

POLYHYDROXY CONDENSATES OF ISOCYANURIC ACID

This invention relates to new polyhydroxyl compounds with an isocyanuric nucleus. The invention also relates to a method of preparing these compounds and to their application to the manufacture of polymers with improved heat-resistance properties, and particularly to the manufacture of rigid, flame-resistant polyurethane foams.

Some polyhydroxyl compounds derived from isocyanuric acid are already known, particularly those such as tris(2-hydroxyethyl) isocyanurate, which is the product of the reaction of ehylene oxide with isocyanuric acid. Tris(2-hydroxyethyl) isocyanurate may be used in the manufacture of polymers, such as rigid polyurethane foams, but it does not produce entirely satisfactory results in this application, since the foams obtained tend to crumble and are not sufficiently self-extinguishing. In addition, tris(2-hydroxyethyl) isocyanurate is difficult to use, as it is solid at ambient temperature and difficult to dissolve.

It is accordingly an object of the present invention to produce and to provide a method for producing polyhydroxyl compounds containing an isocyanuric nucleus which can be used in the preparation of polymers having improved heat resistance, and particularly in the preparation of rigid self-extinguishing polyurethane foams, and it is a related object of this invention to provide such polymers.

The concepts of the present invention reside in novel compounds which are liquid at ambient temperatures and contain at least one isocyanuric nucleus per molecule and a plurality of hydroxyl groups and nitrogen atoms outside the isocyanuric nucleus. The preferred compounds of this invention have hydroxyl numbers within the range of 300 to 700 and a nitrogen content of 9 to 24 percent by weight.

In accordance with the practice of the invention, the novel compounds are prepared by reaction of isocyanuric acid, formaldehyde, and a primary or secondary alkanol amine. Alkanol amines preferred for use in the present invention are those having the formula

wherein R is an aliphatic group containing at least one alcohol function or hydroxy group, and preferably an alkanolyl group containing up to five carbon atoms (e.g., ethanolyl, propanolyl, butanolyl, etc.) and R' is hydrogen, alkyl containing up to 5 carbon atoms (e.g., ethyl, propyl, isobutyl, etc.) or an aliphatic group containing at least one alcohol or hydroxy function and preferably an alkanolyl group as described above containing up to five carbon atoms.

Preferred alkanol amines include diethanol amine, dipropanol amine, monoethanol amine, and monopropanol amine, although use can be made of others such as ethyl ethanolamine, ethyl propanol amine, etc. Although the proportions of the various reagents used may vary within certain limits which will be defined hereinafter, it has been found that polyhydroxyl compounds prepared from one molecule of isocyanuric acid, three molecules of formaldehyde, and three molecules of amino alcohol have a particularly satisfactory set of properties. The chemical structure of these compounds is not known with any certainty, but, without limiting the invention as to theory, the reaction by which they are formed can probably be expressed as follows:

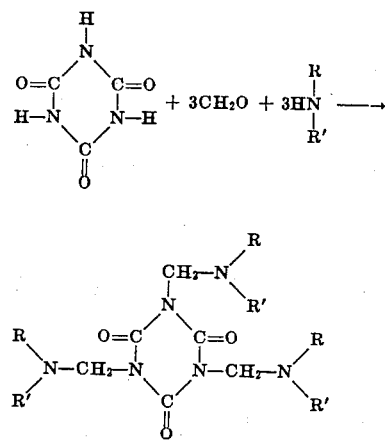

In the above formulas and as indicated above, R represents an aliphatic group containing at least one alcohol function, and R' represents either hydrogen or an alkyl radical or an aliphatic group comprising at least one alcohol function.

In the reaction shown above and in the description and claims only isocyanuric acid is mentioned. "Isocyanuric acid" should be taken as meaning both the ketonic form of this substance, as represented in the formula above and the enolic form, the tautomer of the ketonic form, which is sometimes described as "cyanuric acid".

It has been indicated above that the preferred proportions of the various reagents are three molecules of formaldehyde and three molecules of amino alcohol per molecule of isocyanuric acid. It is possible, however, to depart from these proportions to a certain extent. It has been found that if less than three molecules of formaldehyde are reacted per molecule of isocyanuric acid, it will not be possible to obtain a clear compound, unless the proportion of amino alcohol is increased. It has also been found that the use of a deficiency of amino alcohol relative to formaldehyde produces compounds smelling of formaldehyde and, therefore, probably containing free formaldehyde, which may be unfavorable in certain applications. These findings may be expressed numerically, by specifying that it is preferable to use, per molecule of isocyanuric acid, at least about three molecules of alkanol amine, at least about one and a half molecules of formaldehyde, with the total molecules of formaldehyde and amino alcohol altogether being 6 or higher. It is probable that the polyhydroxyl compounds, prepared as described above from the reagents in non-stoichiometric proportions, are then mixtures containing polyhydroxyl compounds with either cyanuric nuclei, as represented in the formula above, and possibly polycondensates resulting from the action of the formaldehyde on the isocyanuric acid, the polycondensates possible being accompanied by free alkanol amine.

In a preferred method of preparing the polyhydroxyl compounds of the invention, the various reagents are dissolved or dispersed in water; the water may simply be used, with the formaldehyde, in the form of an aqueous solution of this reagent. The reaction mixture is then brought, with stirring, to a temperature preferably slightly below its boiling point which is close to 100° C, until a virtually clear liquid is obtained. The water can then be removed by distillation or the like after cooling.

The compound obtained is in the form of a brown, moderately viscous liquid with an amino smell. Analysis of the liquid reveals the presence of isocyanuric nuclei and of nitrogen atoms outside these nuclei. When the compound of the invention is prepared from diethanol amine as the amino alcohol, its hydroxyl number is close to 700, which shows that there are 6 hydroxyl functions per isocyanuric nucleus.

The polyhydroxyl compounds of the invention may be used without further conversion in the manufacture of polymers, such as rigid polyurethane foams. They may also be used after conversion consisting of fixing, on the polyhydroxyl compounds, alkylene oxides, such as propylene oxide and/or ethylene oxide. These are fixed by the known reaction of polycondensing alkylene oxides onto alcohols, and it should be noted that this can be done without a catalyst, since the amine functions of the polyhydroxyl compound are sufficient for the purpose. These condensates of alkylene oxides, like the polyhydroxyl compounds from which they are derived, are in the form of brown, moderately viscous liquids with an amino smell. Their hydroxyl number varies according to the polyhydroxyl compound used as the starting material and the amount of alkylene oxide condensed. It has been found that condensates of propylene oxide, with a hydroxyl number of from 300 to 700 and preferably around 500, prepared as described above, are particularly suitable for the manufacture of rigid polyurethane foams.

From organic polyisocyanates and the polyhydroxyl compounds of the invention, it is possible to manufacture rigid polyurethane foams which have good mechanical properties and are flame-resistant. In this application, the polyhydroxyl compounds may be used either alone or in combination, with other polyhydric alcohols or phenols (polyols) such as polyesters or polyethers with at least three hydroxyl functions per molecule; in this respect, particularly satisfactory results are obtained with polyether polyols, having an equivalent molecular weight in the region of 130 and resulting from the condensation of propylene oxide on the product of the reaction, in a hydrochloric medium, of ethylene glycol and glucose as, taught in U.S. Pat. No. 3,505,255 of Granger et al.

Any organic polyisocyanates currently employed in the manufacture of polyurethanes, may be used with the hydroxyl compounds of the invention. In particular, polymethylene polyphenyl isocyanate, known by the name of PAPI, and crude diphenyl methane diisocyanate, known by the name of crude MDI may be employed, as well as a variety of others.

For the manufacture of rigid polyurethane foams the various known methods may be used, such as the prepolymer method and the single-stage method. Water or preferably monofluorotrichloromethane are suitable for use as expanding agents. It is generally unnecessary to add a cross-linking catalyst, as the polyhydroxyl compounds of the invention have sufficient reactivity by themselves.

Rigid polyurethane foams prepared from the polyhydroxyl compounds have good mechanical properties and, in particular, shown no tendency to crumble; the foams are also self-extinguishing according to norm ASTM D 1692–59T.

The polyhydroxyl compounds of the invention have other important advantages; in particular, they have a long shelf-life and are easy to use, since they are in the form of liquids of moderate viscosity.

Having described the basic concepts of the invention, reference is now made to the following specific examples which are provided by way of illustration, and not of limitation, of the practice of this invention in the preparation of polyhydroxyl compounds of the invention and their use in the preparation of polyurethane foams.

EXAMPLE 1

In a reactor equipped with mechanical agitating means and a heating device, there are placed in succession:

129 g. of isocyanuric acid (1 gram molecule)
315 g. of diethanol amine (3 gram molecules)
225 g. of a 40 percent by wt. formaldehyde solution (3 gram molecules).

The mixture is heated to 95°C., with stirring. After about 10 minutes the reaction mixture turns to a clear, light brown liquid. The liquid is cooled rapidly by means of an ice bath. When the temperature reaches ambient temperature, the water is eliminated by extraction in vacuo. 480 g. of a dark brown liquid are thus obtained, having a hydroxyl number of 700, a viscosity of 30 csk at 100°C. and a pH of 8.15. Its water content is less than 0.1 percent by weight. Analysis of the compound with infra-red rays reveals the presence of nuclei of isocyanuric acid. Its nitrogen content is 17.5 percent by weight.

EXAMPLE 2

In a reactor equipped with mechanical agitating means and a heating device there is introduced 100 g. of the polyhydroxyl compound prepared in Example 1. Without any catalyst being added and at a temperature of 90°C., 60 g. of propylene oxide is introduced to the reactor. Without any complementary treatment being applied, there is thus obtained 160 g. of a dark brown liquid with a hydroxyl number of 520, a viscosity of 30 csk at 100°C. and a pH of 10.8. Its water content is less than 0.1 percent by weight. Infra-red ray analysis of the product reveals the presence of nuclei of isocyanuric acid. Its nitrogen content is 11 percent by weight.

EXAMPLE 3

In a reactor equipped with mechanical agitating means and a cooling device there are placed 258 g of isocyanuric acid (2 g molecules) and 366 g of monoethanol amine (6 g molecules). When the mixture has been homogenized, 450 g of a 40 percent by weight solution of formaldehyde in water (6 g molecules) is added, drop by drop.

The reaction medium is heated to 95° C and this temperature is maintained for 10 minutes. The contents of the reactor are then cooled to 70° C and, without any catalyst being added, the introduction of the propylene oxide is started. When 230 g of propylene oxide has condensed, 1,100 g of a reddish-brown liquid is obtained, which is dehydrated in vacuo. A further 800 g of propylene oxide is condensed with the dehydrated liquid brought to 90° C.

1720 g of a liquid polyhydroxyl compound are obtained, having a hydroxyl number of 590, a viscosity of 136 csk at 50° C and a pH of 12.3.

EXAMPLE 4

The procedure is as in the previous example, but starting with 129 g of isocyanuric acid (1 g molecule), 525 g of diethanol amine (5 g molecules) and 150 g of a 40 percent by weight solution of formaldehyde in water (2 g molecules). When these reagents have been combined, 150 g of propylene oxide is condensed then, following the dehydration of the condensate, a further 700 g of propylene oxide.

1550 g of a polyhydroxyl compound are obtained, with a hydroxyl number of 570.

EXAMPLE 5

Starting with the polyhydroxyl compound obtained in Example 1, a mixture of a rigid polyurethane foam is prepared, with the following formulations:

| | Parts By Weight |
|---|---|
| polyhydroxyl compound from Example 1 | 50 |
| polyol having a hydroxyl number of about 420, obtained by condensation of propylene oxide with the product of the reaction in a hydrochloric medium, of ethylene glycol and glucose | 50 |
| silicone oil | 1.5 |
| monofluorotrichloromethane | 35 |
| PAPI | 140 |

When the mixture has expanded and the foam hardened, 10 samples are cut out and subjected to tests in accordance with the norm ASTM D 1692-59T. The 10 samples are classed as being self-extinguishing, the total length burnt being 74 mm.

EXAMPLE 6

From the polyhydroxyl compound obtained in Example 2, a mixture of a rigid polyurethane foam is prepared with the following formulation:

| | Parts By Weight |
|---|---|
| polyhydroxyl compound from Example 2 | 100 |
| silicone oil | 1 |
| monofluorotrichloromethane | 35 |
| PAPI | 132 |

When the mixture has expanded and the foam hardened, 10 samples are cut out and subjected to tests in accordance with the norm ASTM D 1692-59T. The ten samples are classed as being self-extinguishing, the length burnt being 76 mm.

It will be understood that various changes and modifications can be made in the details of formulation, procedure, and use without departing from the spirit of the invention, especially as defined in the following claims.

We claim:

1. A polyurethane prepared by reaction of a polyhydroxyl compound having a hydroxyl number within the range of 300 to 700 and a nitrogen content of 9 to 24 percent by weight and prepared by reaction of isocyanuric acid, formaldehyde and a primary or secondary alkanol amine, and an organic isocyanate.

2. A polyurethane as defined in claim 1 wherein the reaction is carried out in the presence of a blowing agent to produce a polyurethane foam.

3. A polyurethane as defined in claim 1 wherein the organic isocyanate is selected from the group consisting of polymethylene polyphenyl diisocyanate and diphenyl methane diisocyanate.

4. A polyurethane as defined in claim 1 wherein the polyhydroxyl compound is reacted with the organic isocyanate in the presence of at least one other polyol.

5. A polyurethane as defined in claim 4 wherein the other polyol is selected from the group consisting of polyesters and polyethers containing at least three hydroxyl groups.

6. A polyurethane as defined in claim 4 wherein the other polyol is a polyether polyol prepared by condensation of propylene oxide with the product of reaction of ethylene glycol and glucose.

7. A polyurethane prepared by reaction of a polyhydroxylated compound having a hydroxyl number within the range of 300 to 700 and a nitrogen content of 9 to 24 percent by weight and prepared by first reacting isocyanuric acid, formaldehyde and a primary or secondary amine and then reacting the resulting product with an alkylene oxide, and an organic isocyanate.

8. A polyurethane as defined in claim 7 wherein the reaction is carried out in the presence of a blowing agent to produce a polyurethane foam.

9. A polyurethane as defined in claim 7 wherein the organic isocyanate is selected from the group consisting of polymethylene polyphenyl diisocyanate and diphenyl methane diisocyanate.

10. A polyurethane as defined in claim 7 wherein the polyhydroxyl compound is reacted with the organic isocyanate in the presence of at least one other polyol.

11. A polyurethane as defined in claim 10 wherein the other polyol is selected from the group consisting of polyesters and polyethers containing at least three hydroxyl groups.

12. A polyurethane as defined in claim 10 wherein the other polyol is a polyether polyol prepared by condensation of propylene oxide with the product of reaction of ethylene glycol and glucose.

13. A polyurethane prepared by reaction of a polyhydroxyl compound having a hydroxyl number with the range of 300 to 700 and a nitrogen content of 9 to 24 percent by weight and prepared by reaction of isocyanuric acid, formaldehyde and a primary or secondary alkanol amine in a mole ratio of at least 3 moles of alkanol amine and at least 1.5 moles of formaldehyde per mole of isocyanuric acid and an organic isocyanate.

14. A polyurethane prepared by reaction of a polyhydroxyl compound have a hydroxyl number within the range of 300 to 700 and a nitrogen content of 9 to 24 percent by weight and prepared by first reacting isocyanuric acid, formaldehyde and a primary or secondary alkanol amine in a mole ratio of at least 3 moles of alkanol amine and at least 1.5 moles of formaldehyde per mole of isocyanuric acid and then reacting the product with an alkylene oxide and an organic isocyanate.

* * * * *